No. 711,661. Patented Oct. 21, 1902.
E. M. HENDERSON.
INLAID TILE FLOOR.
(Application filed July 19, 1902.)
(No Model.)
*Fig. 1.*     *Fig. 2.*
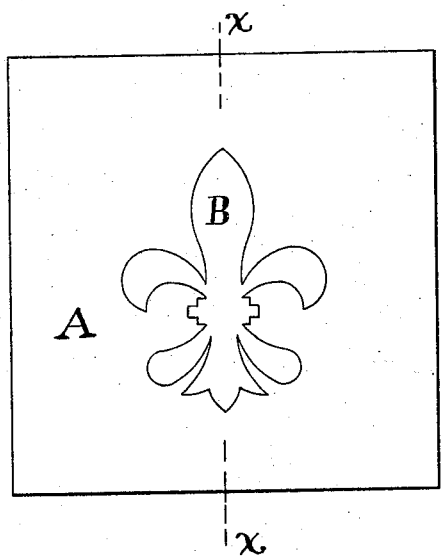 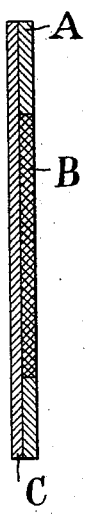
WITNESSES:
INVENTOR
Eliot M. Henderson.
BY
James Harold Warner
ATTORNEY

UNITED STATES PATENT OFFICE.

ELIOT M. HENDERSON, OF NEW YORK, N. Y.

INLAID TILE FLOOR.

SPECIFICATION forming part of Letters Patent No. 711,661, dated October 21, 1902.

Application filed July 19, 1902. Serial No. 116,182. (No model.)

*To all whom it may concern:*

Be it known that I, ELIOT M. HENDERSON, a citizen of the United States, residing in New York city, State of New York, have invented a new and useful Invention in Inlaid Tile Floors, of which the following is a specification.

The invention relates to floors for bathrooms, office-buildings, elevators, decks of boats, and, in general, is for such purposes as tiles and linoleum are employed.

The invention also relates to the method of making this inlaid tile.

The particular object of the invention is to secure greater variety in design and color effect than has been possible with the tiles thus far known.

Another object is to secure greater durability in this form of flooring and at a less expense, and an attendant advantage is the great ease effected in making the product.

The accompanying drawings illustrate my invention.

Figure 1 is a plan view of the inlaid tile floor. Fig. 2 is a cross-section through x x, Fig. 1.

The part A is a field of rubber. B is a piece of rubber of another color. C is a backing of rubber or canvas.

The process of making the inlaid tile is as follows: While in its "green state," apertures of certain sizes and shapes are formed in A by means of a punch. Then with the same punch the pieces, such as B, are punched from another field of rubber of different color, also in its green state. It is thus seen that the part B is necessarily of the same shape and size as the aperture in A. B is then placed in A and a complete backing of rubber or canvas is placed below A, and the three pieces are then put into a hot press and are pressed and vulcanized simultaneously. When taken out of the press the inlaid tile is intact.

The tile is preferably formed of rubber.

The design B of course may be varied without in any way destroying the principle which I have herein set forth.

I claim as my invention—

1. An inlaid tile of rubber formed of a field A of one color, having an aperture therein filled with a plug B of another color, the whole backed by a layer of rubber, and the said three parts united by vulcanization, substantially as described.

2. An inlaid tile formed of a field of rubber of one color, having apertures therein filled with pieces of rubber of different colors from that of the first, the whole backed by a layer of rubber, and the said three parts united by vulcanization, substantially as described.

3. An inlaid tile formed of rubber, consisting of a field of rubber having apertures therein filled with rubber of the same size and shape, but of different colors, the parts being vulcanized, substantially as described.

4. An inlaid tile of rubber, consisting of a field of rubber having apertures in which is inserted rubber of the same size and shape, the parts being vulcanized, substantially as described.

5. An inlaid tile, formed of a field of rubber having apertures in which is inserted rubber of the same size and shape, the whole having a backing of rubber, and all the parts united by vulcanization, substantially as described.

6. The method herein described of making inlaid tiles consisting, first, in punching apertures in a field of flexible material; second: in punching from another field of flexible material different in color from the first, plugs of the same form and size as the apertures in the first field; third: placing the said plugs in the said apertures; fourth: pressing and vulcanizing the said first field and plugs.

7. The method herein described of making an inlaid tile consisting first, in punching apertures in a field of flexible material; second: in punching from another field of flexible material different in color from the first, plugs of the same form and size as the apertures in the first field; third: placing the said plugs in the said apertures; fourth: uniting the said field and plugs with a backing of rubber or canvas by pressing and vulcanizing them; substantially as described.

In witness whereof I have hereunto set my hand, in the presence of two subscribing witnesses, this 17th day of July, 1902.

ELIOT M. HENDERSON.

Witnesses:
JESSIE H. WATERS,
CLARENCE GALICENSTEIN.